United States Patent [19]

Mukai

[11] Patent Number: 4,639,656
[45] Date of Patent: Jan. 27, 1987

[54] ELECTRICAL APPARATUS CONNECTED WITH A BATTERY CHARGER SYSTEM

[75] Inventor: Kiyotaka Mukai, Sumoto, Japan

[73] Assignee: Sanyo Electric Co., Ltd., Osaka, Japan

[21] Appl. No.: 729,689

[22] Filed: May 2, 1985

[30] Foreign Application Priority Data

May 4, 1984 [JP] Japan ............................ 59-65748[U]
May 4, 1984 [JP] Japan ............................ 59-65749[U]
Aug. 3, 1984 [JP] Japan ........................... 59-120501[U]

[51] Int. Cl.⁴ .............................................. H02J 7/00
[52] U.S. Cl. ...................................... 320/22; 320/23; 320/31; 320/37
[58] Field of Search ................... 320/22, 23, 31, 32, 320/37, 38

[56] References Cited

U.S. PATENT DOCUMENTS

4,551,666 11/1985 Wada et al. .................... 320/23 X

Primary Examiner—Peter S. Wong
Assistant Examiner—Mark D. Simpson
Attorney, Agent, or Firm—Stiefel, Gross, Kurland & Pavane

[57] ABSTRACT

An electrical apparatus connected with a battery charger system is comprised of a charge current source (101), charge current controlling means (103), a battery (102, B), switch means (105), load means (104), switch-operating means (106) and a fast-charging period controlling means (107) which provides a capacitor (C5) charged connectedly with the charge of said battery (102, B) and discharged connectedly with the discharge of said battery (102, B) to said load means (104), and serves to flow large current through said charge current controlling means (103) during the interval before the charge voltage of said capacitor (C5) is raised to attain to a predetermined voltage and to flow small current through said means (103) after said interval.

10 Claims, 6 Drawing Figures

ELECTRICAL APPARATUS CONNECTED WITH A BATTERY CHARGER SYSTEM

BACKGROUND OF THE INVENTION

1. Field of the Invention

The present invention relates to an electrical apparatus connected with a battery charger system, particularly to a small type of electrical apparatus connected with a battery charger system such as an electric shaver, an electric toothbrush or the like.

2. Description of the Prior Art

In a small type of electrical apparatus such as an electric shaver or the like characterized by being used in a cordless state, being repeatedly used and being small and light, the battery charger system is one of the important components on which the efficiency of the apparatus depends, and it is desirable that the charger system be a fast battery charger system for charging a battery in a short time.

In a fast rechargeable battery charger system for charging a rechargeable cell such as a nickel-cadmium cell or the like which is nearly fully-charged during a short time of a few minutes, the charging current is so large that the cell reaches an overcharged state, which may make the cell inferior or damage it, when the charging current continues to be supplied to the fully-charged cell.

In order to prevent such overcharging in a conventional fast battery charger system, the prior art has proposed systems for detecting the voltage when the cell voltage is constant and damping an oscillation of a switching transistor comprising an inverter so as to convert large current charging to minimal current charging (e.g. the Japanese published unexamined patent application No. 212333/1983), as well as prior art systems for interrupting the charging or converting large current charging to minimal current charging at a predetermined point in time after the beginning of the charging which point is determined by using a timer IC (e.g. the Japanese published unexamined patent application No. 101537/1982).

However, both of these prior art systems are designed to utilize a timer IC for setting up a charging time and to control charging current by an output signal of the timer IC. Such a control timer IC or the like has a size limit which is standarized or it is more expensive than the other electrical components of the charger, so that, in either event, it is not suitable for a small type of battery charging apparatus.

In the case of a battery charger system for a small electrical apparatus, such as an electric shaver or the like, it is necessary to rapidly charge the quantity of cell capacity sufficiently to correspond with one working time, e.g. one shaving time. In such an instance, a capacitor type of timer has been utilized because it can predetermine the time required for fast charging energy of one working time and further it has a simple construction of the type suitable for a small type of electrical apparatus. However, in this case, there is a need to make the discharging resistance large in order to stabilize the operation of the capacitor used for the timer. As a result, a long interval is required for the discharge of the capacitor and, thus, it is necessary to wait for a long interval until the next fast charging can be carried out. Consequently, it takes a lot of time to re-start the timer and, thus, this method cannot serve to continually operate the timer. Furthermore, this method is also disadvantageous in that this so called fast charging can only occur about once per one day or the like. Thus, it is difficult to utilize this kind of timer for a small-sized battery-charging type of apparatus.

Another type of prior art battery-charging apparatus has generally been provided in which an error-charging prevention mechanism is employed for preventing load from the erroneous operation.

For example, what is disclosed in the Japanese published examined utility model application No. 39367/1975 shows this technique applied to an electric shaver. Namely, it discloses an arrangement in which a power plug is mechanically linked with an operation switch so as to turn off the operation switch inserted between a cell and a motor in response to the operation of projecting the power plug contained in the apparatus. However, since this kind of mechanism is complicated and is difficult to construct during manufacture, it is not preferred.

Moreover, the switching circuit normally employed for a small-sized electrical apparatus such as an electric shaver or the like conventionally has a simple construction. For example, the motor driving circuit disclosed in the Japanese published examined utility model No. 31611/1979 has a very simple construction of only a switch inserted between a power battery and a motor. Namely, most of the prior art switching circuits are occupied with constructions utilizing simple switches such as a slide switch, a push-button switch or the like.

SUMMARY OF THE INVENTION

The present invention of an electrical apparatus connected with a battery charger system is comprised of a rechargeable battery, a charge current source for supplying charge current to the battery and electrically connected to the battery, charge current controlling means for controlling the charge current as large current for fast charging or as small current for normal charging and inserted in a connection circuit for connecting the battery with the charge current source, electrical load means supplied with load current from the battery and electrically connected to the battery, switching means for switching the load current to conduction or non-conduction and inserted in a connection circuit for connecting the battery with the load means, switch-operating means for operating the switching means and electrically connected to the switching means and the battery, and fast-charging-period controlling means electrically connected to the charge current source, the switching means and the charge current controlling means, the fast-charging-period controlling means comprising a capacitor capable of being charged to a potential indicative of the time required to charge the battery to a value sufficient to operate the electrical load for a fixed period of time and discharged across a discharge resistor and the switching means.

Further, in order to arrange the discharge characteristics of the capacitor, the discharge resistor may be connected in parallel with a thermosensitive resistor thermally coupled to the switching means.

The switch-operating means may be constructed by an automatic reset type of driving switch and stop switch for the load means and a manual reset type of lock switch therefor.

Moreover, in order to prevent an erroneous charging operation when the load is electrically driven, the switch-operating means opens the circuit of the switching means by means of an output voltage detecting means which detects the output of the charge current source.

In addition, preferably the load which is electrically driven by the rechargeable battery power supply is a small-sized motor of an electric shaver, an electric hair clipper, an electric toothbrush or the like.

DESCRIPTION OF THE PREFERRED EMBODIMENTS

Figure 1:
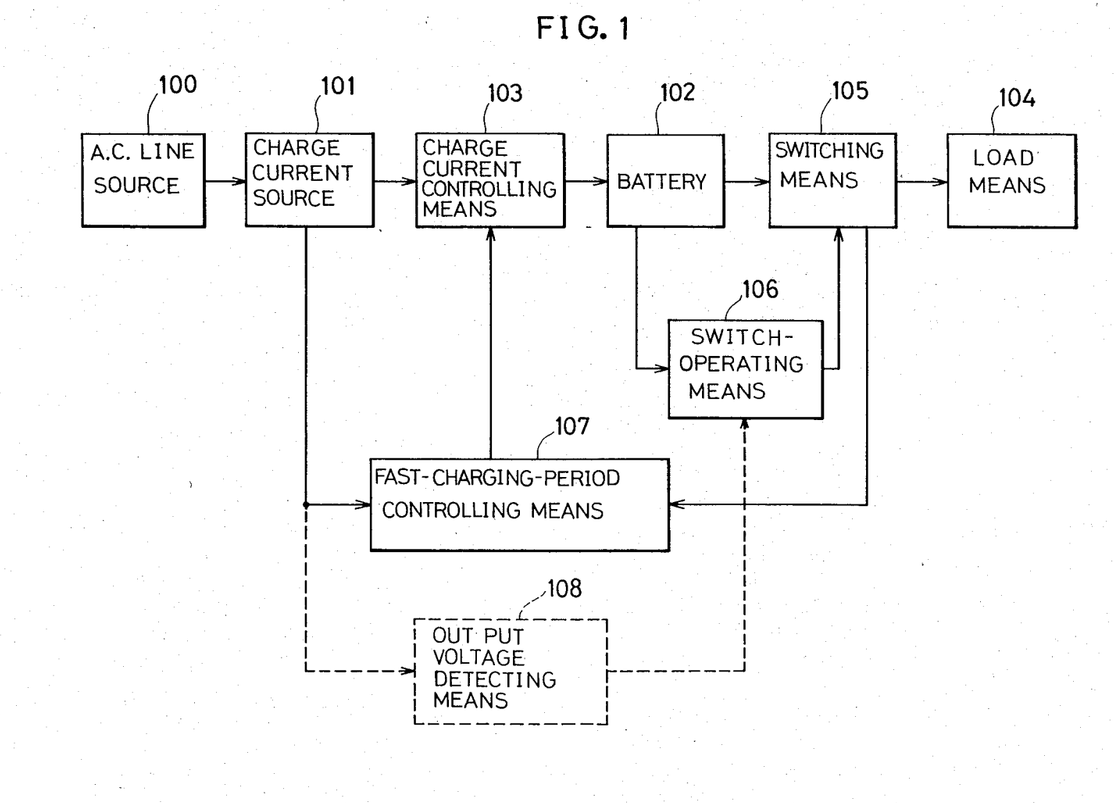
FIG. 1 is a functional block diagram of the present invention of a battery powered electrical apparatus containing te presently preferred battery charger system.

FIG. 1 is a block diagram showing the construction of the present invention. Charge current source 101 serves to rectify the electic power supplied from A.C. line source 100 and to supply charging current to rechargeable battery 102. Charge current controlling means 103 is inserted in a connection circuit between the battery 102 and the charge current source 101 and serves to control the charge current to provide a large current for fast charging or a small current for normal charging. Load means 104 is electrically connected to the battery 102 and is supplied with the load current from the battery 102. Switching means 105 is connected between the battery 102 and the load means 104 and serves to switch the load current into conduction or non-conduction to load means 104. Switch-operating means 106 is electrically connected to the switching means 105 and the battery 102 and serves to operate the switching means 105. Fast-charging-period controlling means 107 is electrically connected to the charge current source 101 and the switching means 105 and the charge current controlling means 103. The fast-charging-period controlling means 107 provides a capacitor type of timer which starts counting time with the onset of the charge of the battery 102 and counts the time of the setting period required for fast charging of the electrical energy conforming to about one working or use of the electrical apparatus and resets the counting time with the onset of the discharging of the battery 102 to the load means 104. Moreover, controlling means 107 passes the large current for the fast charging through the charge current controlling means 103 only during the setting period and, after this period, passes the small current required for normal charging. Output voltage detecting means 108 is electrically connected to the charge current source 101 and the switch-operating means 106 and detects the output voltage of the charge current source 101 connected to the A.C. line source 100 and then makes the switch operating means 106 open the circuit of the switching means 105.

In any electrical apparatus connected with a battery charger system of the present invention, the user closes the circuit of the switching means 105 by means of the switch-operating means 106 to conduct load current from the battery 102 to the load means 104 such as an electric razor. When the user notes that the load means 104 is not driven, in other words, is not operating, the user will become conscious that the battery 102 needs charging and would connect the charge current source 101 to the A.C. line source 100 in order to charge the battery 102 to the value needed to operate or drive the load 104. Since the capacitor type of timer provided in the fast-charging-period controlling means 107 is reset by the current flow operation of the load current of the battery 102, the charge current controlling means 103 serves to enable rapid flow of the large current used for fast charging to the battery 102 while the timer is counting the setting time (a few minutes) required for the fast charging and, after that, enables the small current for normal charging to flow to the battery 102. If the user is not in a hurry to use this electrical apparatus after approximately the rated charge time (a few hours) of the battery 102, the user would disconnect the charge current source 101 from the A.C. line source 100 and use this electrical apparatus off of the recharged battery 102 when desired. Under such circumstances, if the electrical apparatus were again connected to the A.C. line 100 before using it, the recharged battery could not be over-charged by the aforementioned fast charging and the apparatus is safe in use because the timer would not be reset. In the instance when the battery 102 is not charged and the user is in a hurry to use this electrical apparatus, the fast charging of the battery would be carried out during the predetermined time set by the timer provided in the fast-charging-period controlling means 107. In this case, since the battery 102 is charged with the energy conforming to one working of the apparatus, the user can then immediately use this electrical apparatus one time. In the instance when the user is using the electrical apparatus and the load means stops due to the battery 102 losing its charge, the user could again fast charge the battery 102 as discussed above, and, the user could then use the electrical apparatus again after a wait of for only a few minutes. If the user attempts to erroneously connect the charge current source 101 to the A.C. line source 100 with the switching means 105 in the closed state in order to operate the apparatus during charging, the output voltage detecting means 108 serves to drives the switching means 105 from the closed state to the open state via the switch-operating means 106 thereby preventing the load from being driven or operated during charging.

Figure 2:
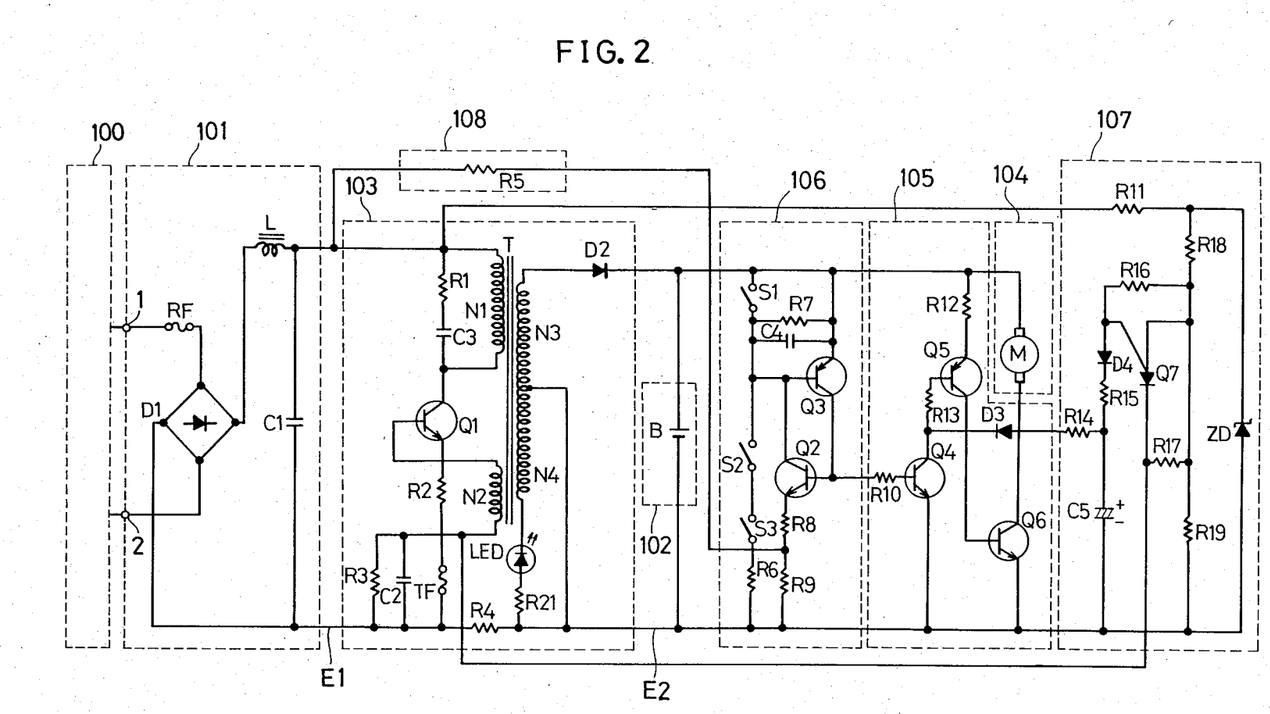
FIG. 2 is a schematic diagram illustrating one embodiment of the present invention.

FIG. 2 is a circuit schematic diagram showing one embodiment of the present invention applied to an electrical shaver and corresponds with the functional block diagram of FIG. 1 with like reference numerals being used for like functional components.

In the embodiment of FIG. 2, the charge current source 101 is comprised of input terminals 1, 2 for the A.C. line source 100, a bridge rectifier D1 for converting alternating current from the A.C. line source 100 into D.C. current, a current fuse RF inserted between the rectifier D1 and input terminal 1, a smoothing choke coil L and a capacitor C1.

The charge current controlling means 103 is comprised of an inverter-transformer T, a primary coil N1 of the inverter-transformer T connected to the rectifier D1 via the choke coil L, a feedback coil N2 connected to the rectifier D1 via a resistor R3, a transistor oscillator Q1 connected to the primary coil N1 in series and whose base is connected to the feedback coil N2, a series connection composed of a capacitor C3 and a resistor R1 connected to the primary coil N1 in parallel, a capacitor C2 and a resistor R3 respectively connected between the feedback coil N2 and the rectifier D1, a thermal fuse TF for connecting the emitter of the transistor oscillator Q1 to the rectifier D1 via the resistor R2, secondary coils N3, N4 of the transformer T, a light emitting diode LED connected to the secondary coil N4 via a resistor R21, a rectifier D2 connected to the secondary coil N3 and a resistor R4 for connecting a ground line E1 connected to a negative output of the rectifier D1 to a ground line E2 connected to a negative output of the secondary coil N3. The battery 102 is comprised of a Ni-Cd cell B and is connected to the secondary coil N3 via the rectifier D2 and the ground line E2. The load means of the shaver is comprised of a D.C. magnet motor connected to the cell B via the switching means 105. The switching means 105 is comprised of a transistor Q6 connected to the cell B and the motor M and for driving or stopping the motor M in accordance with conduction or non-conduction between the emitter and the collector of the transistor Q6, a transistor Q5 whose collector is connected to the base of the transistor Q6 and whose emitter is connected to the plus terminal of the cell B via a resistor R12, and a transistor Q4 whose collector is connected to the base of the transistor Q5 via a resistor R13 and whose emitter is connected to the minus terminal of the cell B. The switch-operating means 106 is comprised of a series circuit connected to an output terminal of the cell B and composed of an automatic reset type of normally-opened switch S1, an automatic reset type of normally-opened switch S2, a lock switch S3 and a resistor R6, a transistor Q3 whose emitter and base are connected to the switch S1 in parallel and whose collector is connected to the base of the transistor Q4 in the switching means 105 via a resistor R10, a resistor R7 and a capacitor C4 respectively inserted between the base and the emitter of the transistor Q3 in parallel for stabilizing the base current, a transistor Q2 whose collector and emitter is, in parallel, connected to the series circuit composed of the switch S2, the switch S3 and the resistor R6 via emitter resistors R8, R9 for adjusting the operating voltage of the transistor Q2, and whose base is connected to the collector of the transistor Q3. The fast-charging-period controlling means 107 is comprised of a Zener diode ZD connected between the choke coil L and the ground line E2 via a resistor R11, a series circuit composed of resistors R18 and R19 and connected to the Zener diode ZD in parallel, a series circuit composed of a resistor R16, a diode D4, a resistor R15 and a capacitor C5 and connected between a contact of the resistors R18 and R19 and the minus terminal of the cell B, a programable unijunction transistor Q7 (hereinafter, referred as a PUT) whose anode is connected to a contact of the resistors R18 and R19 and whose gate is connected to a contact of the resistor R16 and the diode R4 and whose cathode is connected to the feedback coil N2 of the charge current controlling means 103, a resistor R17 connected between the anode and the cathode of the PUT Q7, and a resistor R14 connected to the collector of the transistor Q4 in the switching means 105 via the diode D3. The output voltage detecting means 108 is comprised of a resistor R5 connecting the choke coil L of the charge current source 101 to the contact of the emitter resistors R8 and R9 of the transistor Q2 in the switch-operating means 106.

Next, the function of the circuit shown in FIG. 2 is described.

When the input terminals 1, 2 are connected to the A.C. line source 100, the input is rectified by the rectifier D1. The D.C. current obtained thereby is made smooth by the choke coil L and the capacitor C1 and then is supplied to the primary coil N1 and the feedback coil N2 and at once to the resistor Rll and Zener diode ZD. Thus, the current flows through the resistor R18, the resistor R16, the diode D4, and the resistor R15 to the capacitor C5 so as to charge the capacitor C5. On the other hand, while charging it, the gate voltage of the PUT Q7 is lower than the anode voltage thereof. Thus, the PUT Q7 conducts, so that the current flows from the resistor R18 to the base of the transistor Ql through a parallel circuit composed of the PUT Q7 and the resistor R17 and the feedback coil N2. Accordingly, the transistor Q1 conducts and thus the current flows through the primary coil N1. The voltage is induced in the feedback coil N2 by the current flow of the primary coil N1 and the base current of the transistor Q1 is enlarged so as to result in larger current flow of the primary coil N1 by the transistor Q1. If the inverter-transformer T is saturated as a result of enlarging the current of the coil N1, the voltage induction in the feedback coil N2 does not occur and the transistor Q1 serves to reduce the current in the feedback coil N2. The reverse voltage is induced in the feedback coil N2 by the reduction of the current of the coil N2 and thus the base and the emitter of the transistor Q1 is reverse-biased. As a result, the current flow through the primary coil N1 is stopped. Again, the current supplied from the PUT Q7 and the resistor R17 flows through the base of the transistor Q1 and the transistor Q1 conducts so as to cause current flow in the primary coil N1. This function is repeatedly accomplished in order to oscillate the inverter.

When the inverter is oscillated, the induced current flows through the secondary coils N3, N4 to light the light emitting diode LED and to charge the cell B therewith via the diode D2.

During the conduction period of the PUT Q7, the current flow through the primary coil N1 is enlarged and thus the oscillation frequency in the inverter is made larger, resulting in making the charging current of the cell B far larger.

If the capacitor C5 is further charged and thus the gate voltage of the PUT exceeds the anode voltage thereof, the PUT is driven to the off state. As a result, since the current flow from the PUT to the feedback coil N2 is made smaller, the current flow through the primary coil N1 is reduced and thus the charging current of the cell B is made lower so as to be a small current.

When the switch S2 is closed for an instant in driving the motor M, the base voltage of the transistor Q3 is lowered and thus the transistor Q3 conducts. In this case, the lock switch S3 is closed. The base voltage of the transistor Q2 conducts heightened and thus the transistor Q2 conducts. Accordingly, even if the switch S2 is opened, the base voltage of the transistor Q3 is kept low and the transistor Q3 is held in a conduction state. Further, since the base voltage of the transistor Q4 is raised, the transistor Q4 conducts. Thus, since the base voltage of the transistor Q5 is lowered, the transistor Q5 conducts and as a result, since the base voltage of the transistor Q6 is raised, the transistor Q6 conducts. Consequently, the driving current is supplied from the cell B to the motor M, so that the motor M starts to drive thereby operating the shaver.

If the switch S1 is closed for an instant in stopping the motor M, the base voltage of the transistor Q3 is raised to as high a value as the emitter voltage thereof and thus the transistor Q3 is made non-conductive and the transistor Q2 is concurrently made non-conductive so as to hold the non-conductive state of the transistor Q3. Accordingly, the transistors Q4, Q5 and Q6 are all made non-conductive and as a result, the motor M stops driving and the shaver stops.

Since the voltage between the emitter and the collector of the transistor Q3 in conduction is 0.2 V or less, even if the output voltage of the cell B is lowered to approximately 0.8 V, a large voltage, enough to drive the transistor Q4, is applied to the transistor Q4 and thus it is possible to keep driving the motor M normally.

If the input terminals 1,2 are connected to the A.C. line source when charging, the rectified output of the rectifier D1 is applied to a contact of the emitter resistors R8 and R9 via resistor R5, so that the voltage of the emitter of the transistor Q2 is raised. Thus, the transistor Q2 is turned off and thus it is possible to obtain the same state as when the switch S1 is operated. Even if the motor M is driven, this function can be effectively accomplished and thus there is no failure of charging.

The discharge circuit of the capacitor C5 is composed of the capacitor C5, the resistor R14, the diode D3 and the transistor Q4. When the switch S2 is closed for an instant to make the transistor Q4 conductive, the charges stored in the capacitor C5 flow through the resistor R14, the diode D3, to the collector of the transistor Q4 and then are discharged. The diode D3 prevents current flow from the switching means 105 to the capacitor C5 when working the load.

Since, the charging time of the capacitor C5 is set to coincide with the time possible to accomplish the fast charging, the current supplied to the cell B can be switched from a large one to a minimal one so as to prevent overcharging of the cell B by making the PUT Q7 non-conductive when the charging of the capacitor C5 is completed. It is possible to control the fast charging time by arranging the resistance of the resistor R15.

In the example of an electric shaver employing the charging circuit of the present invention, one set fast charging time is T1, one set working time (the discharging time of the cell B) is T2, the fast charging current is Ic1, the load current is IL1, the discharge efficiency and the charge efficiency are, respectively, EL and EC. In the example when the cell B charges to an energy level conforming to one working time by one fast charging, cell B carries out the fast charging for the time T1 in accordance with the formula;

$$T1 = \frac{IL1 \times T2 \times EL}{Ic1 \times EC} \quad (1)$$

Thus, this embodiment by way of example uses a Ni-Cd cell which has the following values; supposing the load current IL1 of the motor is 500 mA and one shaving time T2 is 5 minutes, the discharge efficiency EL is 0.9, the charge efficiency EC is 0.85, the fast charge current Ic1 is 900 mA, the normal charge current is 100 mA, the time possible to accomplish one fast charging T1 is 3 minutes and the normal charging time is 8 hours, which satisfy the formula (1).

Figure 3:
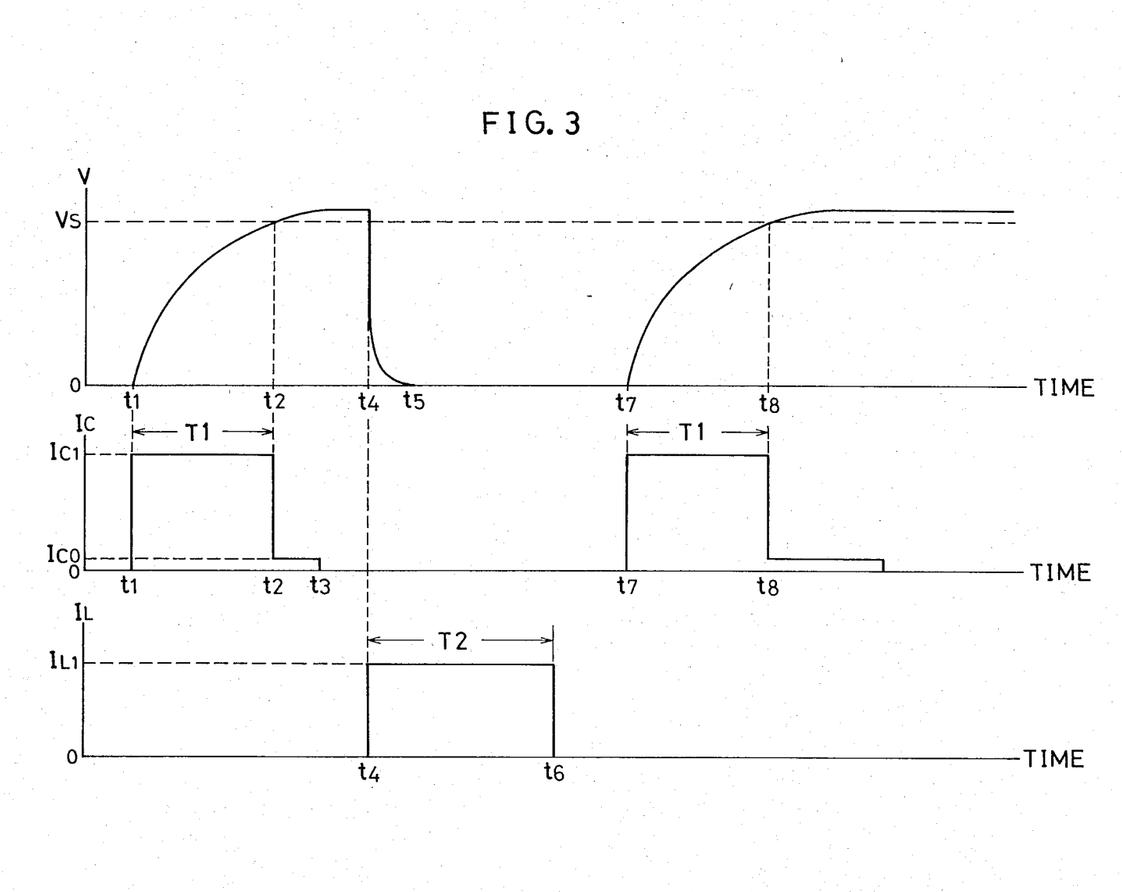
FIG. 3 is a diagrammatic illustration of changes in time of the voltage and the current for various portions of the circuit of FIG. 2.

FIG. 3 is an explanatory view showing the change in time in the case of the voltage V between the terminals of the capacitor C5, the charging current Ic of the cell B and the load current IL of the motor M.

If the input terminals 1, 2 of the electrical shaver are connected to the A.C. line source 100 at time t1, the capacitor C is charged and its voltage V starts to rise and at once the current Ic1 flows through the cell B so as to start the fast charging. When the capacitor voltage V is made higher than the anode voltage Vs of the PUT Q7 at time t2 when the charge conforming to one working time is completed, the charge current to the cell B is switched to the minimal Ico. At time t3, the input terminals 1, 2 are disconnected from the A.C. line source 100, however the capacitor voltage V keeps the saturation voltage which is larger than Vs. Thus, since only the minimal current Ico flows through the cell B even if the input terminals 1, 2 are again connected to the A.C. line source 100 at this time, there is no possibility that the cell is overcharged. When the electric shaver is used at time t4, the motor current IL1 flows and at once the capacitor C5 starts to discharge. The voltage V of the capacitor C5 is essentially zero at time t5 before time t6 when the electric shaver is stopped after one working time T2 is passed. Thus, after the first working of the shaver, if the input terminals 1, 2 are connected to the A.C. line source at time t7, the current IC1 flows through the cell B at time t7 to time t8, similarly with the former time, so as to immediately charge to an energy level conforming to one woring of the shaver and finish the preparation of the battery for the next working of the electric shaver.

As stated above, according to this embodiment, it is possible to provide a small-sized electric shaver with excellent operating characteristic having a battery charger system which can prevent the operation of the load during charging, repeat the fast charging after one working and prevent overchargeing.

In the battery charger system described above, it is possible that after one working, assuming the system carries out the fast charging of the battery during the defined time T1 (e.g. 3 minutes) conforming to the defined time T2 for one working (e.g. 5 minutes), if the fast charging during the defined time T1 is accomplished, after the battery charged to the rated capacity and is once worked during a shorter time than the defined working time T2, the battery could become overcharged and be damaged.

Figure 4:
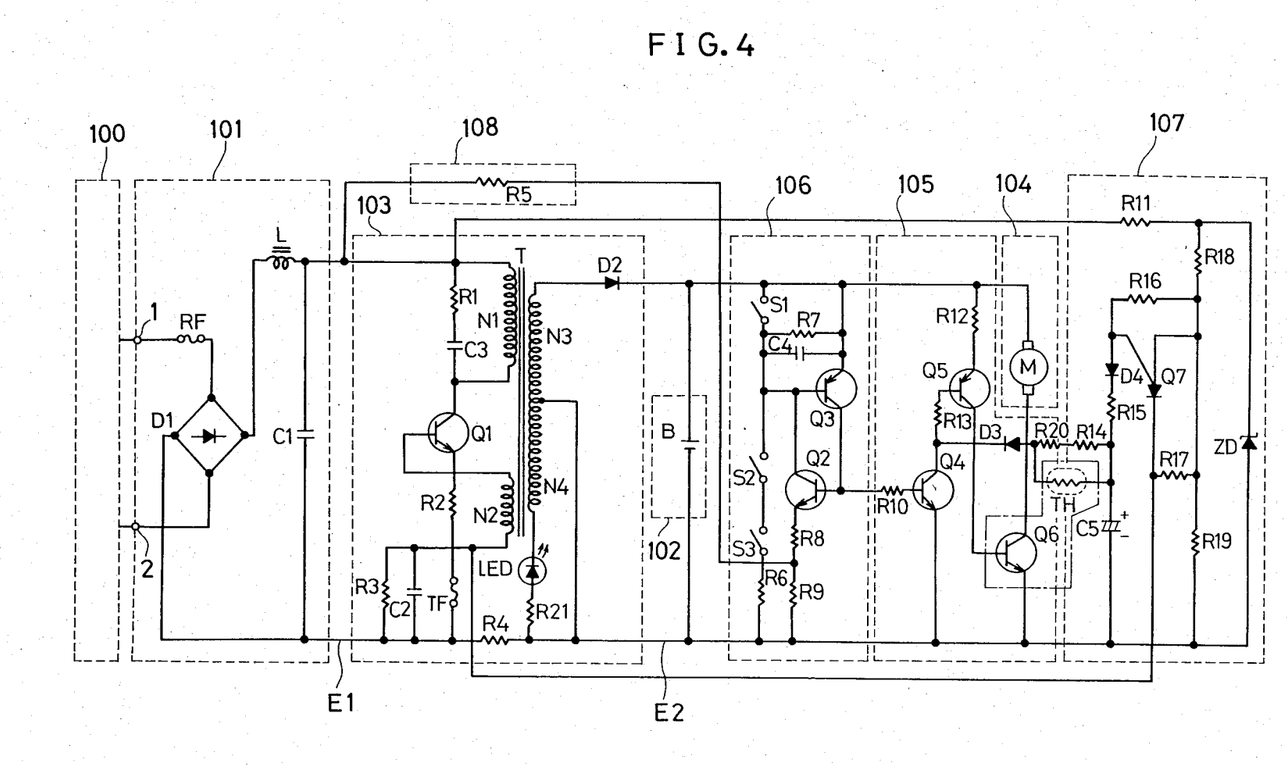
FIG. 4 is a schematic diagram illustrating another embodiment of the present invention.

In order to avoid this possibility, the embodiment of FIG. 2 may be modified as shown in FIG. 4. In the embodiment of FIG. 4 a resistor R20 is connected to the resistor R14 in series and a thermosensitive resistor TH, thermally coupled to the transistor Q6 and connected in parallel to resistors R14 and R20. The other part of FIG. 4 is equivalent to the circuit shown in FIG. 2. In addition, the thermosensitive resistor TH utilizes a thermistor whose resistance value is lowered in accordance with the rise in temperature, that is, resistor TH has a negative temperature characteristic.

Figure 5:
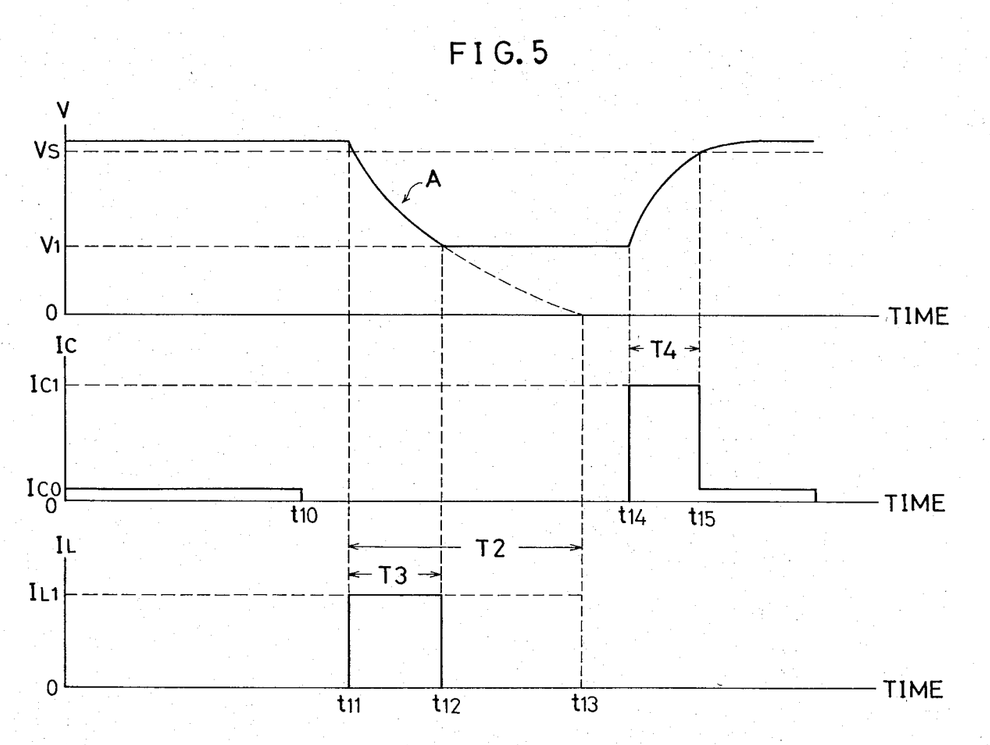
FIG. 5 is a diagrammatic illustration, similar to FIG. 3 of changes in time of the voltage and the current for various portions of the circuit of FIG. 4.

The operation of the circuit of FIG. 4 is described with reference to FIG. 5. If the input terminals 1,2 are disconnected from the A.C. line source 100 after the battery is fully charged until the time t10, the voltage V of the capacitor C5 keeps a higher saturation voltage than Vs. If the electric shaver, by way of example, is utilized at time t11, the motor current IL1 flows and the capacitor C5 starts to discharge at once by means of the discharge circuit composed of the resistor R14, the resistor R20, the resistor TH, the diode D3 and the transistor Q4. Since at this time, the temperature of the transistor Q6 is low and the value of the resistor TH is much larger than those of the resistors R14 and R20, the main charge of the capacitor C5 is slowly discharged through the resistors R14 and R20. Since the rise of the temperature of the transistor Q6, lowers the value of the thermosensitive resistor TH, and the capacitor C5 is discharged through the series circuit composed of the resistors R14 and R20 and the thermosensitive resistor TH. At the time t13 after the defined working time T2, the capacitor C5 completes the discharge. Thus, if the electric shaver is stopped at the time t13 and then the charging is accomplished, the cell B can complete the charging during only the defined charge time T1 shown in FIG. 3.

Figure 6:
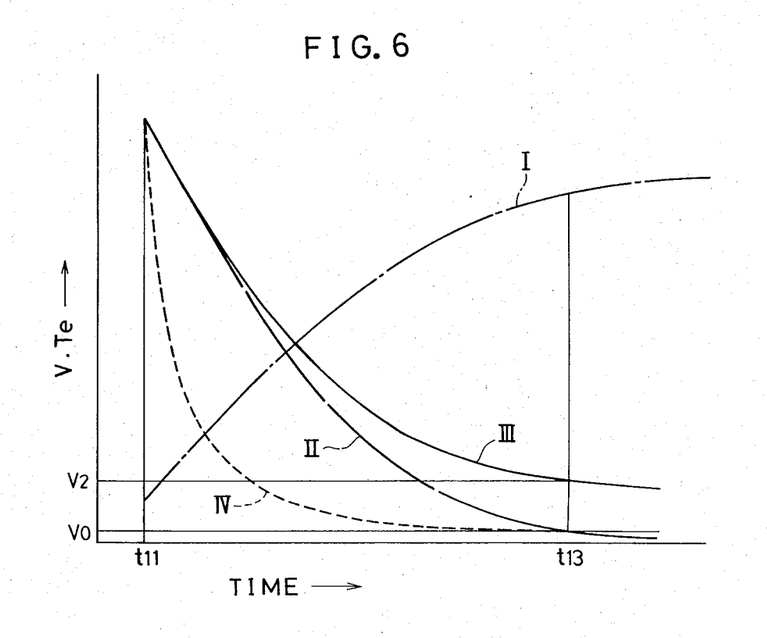
FIG. 6 is a graph illustrating changes in time of the voltage of the capacitor and the temperature of the transistor of FIG. 4.

On the other hand, if the electric shaver is stopped at the time t12 after the shorter working time T3 than the defined working time T2, the capacitor C5 remains charged at the voltage V1, because, as stated above, the resistors R14 and R20 and the thermosensitive resistor TH prevent the capacitor C5 from discharging fast. That is to say, since at the time t12 the discharge of the capacitor C5 is stopped by the stopping of the operation of the electric shaver, the voltage V1 is kept in the capacitor C5. Next, if at the time t14, the input terminals 1, 2 are connected with the A.C. line source 100, the fast charging is stopped after the shorter time T4 than the defined charging time T1, because at the beginning of the fast charging, the voltage of the capacitor C5 starts to rise from the voltage V1 and exceeds the voltage Vs at the time t15 after the time T4. Accordingly, by means of the resistor R14, R20 and the thermoresistor TH, the relation between the time T3 and T4 is well controlled for preventing the overcharging. As stated before, the relation between the times T3 and T4 depends upon the change (curve A) in time of the voltage V of the capacitor C5 which starts to discharge at the start of working the electric shaver. FIG. 6 is an explanatory view showing the change in time of the voltage V of the capacitor C5 and the temperature Te of the transistor Q6 in detail. Curve I is a temperature-rise-curve of the transistor Q6. It is obvious that the temperature rises as the time passes from the curve. Curve II denotes a discharge characteristic curve of the capacitor C5 and shows the case where one working time of the motor M is defined as t13−t11=5 min. It is obvious that the capacitor C5 is essentially discharged within the working time, because the voltage V between both terminals of the capacitor C5 is Vo(≈0). Curve III, which is a discharge characteristic curve of the capacitor C5 where the thermosensitive resistor TH is not used, shows the voltage between both terminals is not lowered to less than V2(V2>V0) within the working time and that there is still considerable charge remaining in the capacitor C5. Further, if the resistance values of the resistors R14 and R20 are made smaller and the thermosensitive resistor TH is not utilized, the voltage between both terminals of the capacitor C5 is abruptly lowered as shown in Curve IV. Thus, before the cell B completely discharges sufficient conforming to one working of the motor M, the capacitor C5 finishes the discharging and as a result the problem that the next charge is made overcharged is brought about. Namely, in case the discharge circuit is composed of only ordinary resistors, curve A changes simply as an exponential function curve. However if the thermosensitive resistor TH thermally coupled to the transistor Q6 is connected to the resistors R14 and R20 as shown in the embodiment of FIG. 4, it is possible to obtain a discharge characteristic (curve A) of the capacitor C5 in which the fast charging time T4 in the case of the next charging can be automatically determined by the following formula in relation to an optional working time T3 which is equal or shorter than the defined working time T2;

$$T4 = \frac{IL1 \times T3 \times EL}{Ic1 \times EC} \quad (2)$$

Accordingly, in the embodiment of FIG. 4, if the electric shaver is used during a shorter time than the defined working time and then is charged at once, since the fast charging time is shortened as compared with the actual working time and the electric shaver is charged with only the energy required for consumption, there is no possibility that the battery can become overcharged.

What is claimed is:
1. An electrical apparatus connected with a battery charger system comprising;
a rechargeable battery,
a charge current source for supplying charge current to said battery and electrically connected to said battery, means for controlling said charge current supplied to said battery, said charge current controlling means changing large current for fast charging into small current for normal charging of said battery by said charge current supplied thereto, said charge current controlling means being interconnected between said battery and said charge current source and disposed therebetween,
electrical load means supplied with load current from said battery and electrically connected to said battery,
switching means interconnected between said battery and said load means for switching between a conduction and a non-conduction state for controlling the supply of said load current to said load means from said battery,
switch-operating means interconnected between said battery and said switching means for operating said switching means to switch between said conduction state and said non-conduction state, and
fast-charging-period controlling means electrically connected to said charge current source, said switching means and said charge current controlling means for controlling the supply of said large current for fast charging by said charge current controlling means,
said fast-charging-period controlling means comprising a capacitor capable of being charged to a potential indicative of the time required to charge said battery to a value sufficient to operate said load means for a fixed period of time and discharged across a resistor and said switching means, said charge current controlling means enabling rapid flow of said large current used for fast charging to said battery during the interval when the charge voltage of said capacitor is raised to said indicative potential and thereafter enabling said small current for said normal charging to flow through said charge current controlling means; whereby said battery for operating said load means can be rapidly charged to a value sufficient to permit the operation thereof for said period while enabling normal charging of said battery thereafter.

2. The electrical apparatus connected with a battery charger system according to claim 1, wherein said capacitor is connected with said charge current source via a charge resistor.

3. The electrical apparatus connected with a battery charger system according to claim 1, wherein said capacitor is connected to said switching means via said discharge resistor for enabling said capacitor to start to discharge concurrently with the operation of said load means.

4. The electrical apparatus connected with a battery charger system according to claim 1, wherein said capacitor is connected to said switching means via a parallel circuit composed of said discharge resistor and a thermosensitive resistor thermally coupled to said switching means for enabling said capacitor to start to discharge concurrently with the operation of said load means.

5. The electrical apparatus connected with a battery charger system according to claim 1, wherein said fast-charging-period controlling means comprises a switching element with a gate for providing the charging current to said charge current controlling means, said charge current controlling means outputting the large current for fast charging when current flows through said switching element guide.

6. The electrical apparatus connected with a battery charger system according to claim 1, wherein said fast-charging-period controlling means with said capacitor further comprises a switching element with a gate, a charge resistor and said discharge resistor, the gate of said switching element being supplied with the terminal voltage of said capacitor which stores the charges supplied from said charge current source via said charge resistor at the beginning of said charging of said battery and discharges the charges via said discharge resistor during the period when said switching means is in said conduction state, said switching element being in a non-conduction state when the terminal voltage of said capacitor reaches a predetermined voltage.

7. The electrical apparatus connected with a battery charger system according to claim 1, wherein said switch-operating means comprises;
a series circuit comprising a switch for stopping the operation of said load means and connected with the output of said battery, and a switch for enabling the operation of said load means, and a lock switch for preventing the operation of said load means and a resistor,
a first transistor whose emitter and base are connected in parallel with said switch for stopping the operation of said load means and whose collector is connected with said switching means, and
a second transistor having a base, a collector and an emitter and an emitter resistor and being connected in parallel with said series circuit via said emitter resistor, said second transistor base being connected to the collector of said first transistor.

8. The electrical apparatus connected with a battery charger system according to claim 1, further comprising an output voltage detecting means connected between said charge current source and said switch operating means, said switch operating means making said switching means open in response to the output of said output voltage detecting means.

9. The electrical apparatus connected with a battery charger system according to claim 7, wherein said second transistor of said switch-operating means has its emitter connected to the output of said charge current source via a resistor.

10. The electrical appartus connected with a battery charger system according to claim 1, wherein said electrical load means is a motor for an electric shaver.

* * * * *

UNITED STATES PATENT AND TRADEMARK OFFICE
CERTIFICATE OF CORRECTION

PATENT NO. : 4,639,656
DATED : January 27, 1987
INVENTOR(S) : Kiyotaka Mukai

It is certified that error appears in the above-identified patent and that said Letters Patent is hereby corrected as shown below:

```
In column  1, line 20: before "battery" insert --rechargeable--;
In column  3, line 13: change "te" to --the--;
In column  4, line 46: delete "for" after "of";
In column  4, line 51: change "serves to drives" to --drives--;

In column  5, line 59: change "programable" to --programmable--;
In column  7, line 20: after "Q4" (second occurrence) insert
                       --,--;
In column  7  line 62: after "embodiment" and after "example"
                       insert --,--;
In column  8  line 33: change "woring" to --working--;
In column  8  line 40: change "overchargeing" to --overcharging--;
In column  8  line 55: after "Q6" insert --,--;
In column  9  line 63: after "sufficient" insert --energy--;
In column 11  line  1: before "period" insert --fixed--;
In column 11  line 28: change "guide" to --gate--.
```

Signed and Sealed this

Twenty-third Day of February, 1988

Attest:

DONALD J. QUIGG

*Attesting Officer*  *Commissioner of Patents and Trademarks*